United States Patent [19]

Vinciguerra

[11] Patent Number: 4,487,014

[45] Date of Patent: Dec. 11, 1984

[54] GAS GENERATOR AND TURBINE UNIT

[75] Inventor: Costantino Vinciguerra, Florence, Italy

[73] Assignee: Nuovo Pignone S.p.A., Florence, Italy

[21] Appl. No.: 374,383

[22] Filed: May 3, 1982

[30] Foreign Application Priority Data

May 4, 1981 [IT] Italy ................. 21493 A/81

[51] Int. Cl.³ .............................. F02C 7/20
[52] U.S. Cl. .................. 60/39.31; 60/39.32; 415/219 R
[58] Field of Search ............ 60/39.31, 39.32, 39.161; 415/134, 138, 219 R

[56] References Cited

U.S. PATENT DOCUMENTS

| | | | |
|---|---|---|---|
| 2,992,809 | 7/1961 | Herbage | 60/39.32 |
| 3,628,884 | 12/1971 | Mierley, Sr. | 415/219 R |
| 3,837,164 | 9/1974 | Carr | 60/39.31 X |
| 3,860,359 | 1/1975 | De Feo | 60/39.31 X |
| 4,002,023 | 1/1977 | Hartmann | 60/39.31 |
| 4,102,598 | 7/1978 | Stock et al. | 415/219 R X |

FOREIGN PATENT DOCUMENTS 369680  3/1932  United Kingdom ............... 415/138

*Primary Examiner*—Carlton R. Croyle
*Assistant Examiner*—Jeffrey A. Simenauer
*Attorney, Agent, or Firm*—Hedman, Gibson, Costigan & Hoare

[57] ABSTRACT

A gas turbine power unit is disclosed in which the arrangement and configuration of parts is such as to save space and weight in order to provide a compact and self-contained assembly. An air-intake casing (2) supports the upstream end of a gas generator (3), the downstream end of which is integral with a power turbine (4). The stator casing (5) of the turbine (4) is connected to a cone (6) thermally insulated and completely inserted into any exhaust casing (7) having a vertical outlet, wherein the turbine exhaust is conveyed into the exhaust casing (7) by an annular diffusing cone (8). The turbine casing is supported on four legs (15, 16). In addition, the turbine rotor (10) and thus the turbine shaft (11) are overhangingly supported by an independent structure (12), the weight of which bears on the machine base (1) outside the exhaust casing (7) and away of the power turbine space.

4 Claims, 6 Drawing Figures

GAS GENERATOR AND TURBINE UNIT

This invention relates to improvements in a power gas turbine for high efficiency, considerable simplification in structure and a reduced overall size in the unit.

Increasingly gas turbines are using gas generators of aeronautical design upstream of a power section generally comprising two or three stages which convert the hot gas energy produced by the gas generator into shaft power. More specifically, the apparatus has an air intake casing which supports the front end of a gas generator whose downstream end is rigid with the stator casing of a power turbine connected in turn, by way of a downstream support cone, to an exhaust casing with its outlet generally vertical, and into which the gas is discharged by passing through a conical annular diffuser. In this apparatus, the method mostly used in the state of the art for maintaining the necessary coaxiality between the rotor and stator of the power turbine is to support the rotor and consequently the rotating shaft by the stator casing itself by means of a set of ribs under the latter, which ribs support the bearing of the rotating shaft.

This method has however various drawbacks, of which the main one is a low efficiency caused by high speed gas leakages against the support ribs for the rotating shaft bearing. A further drawback is due to the considerable constructional complexity of these ribs, which have to be of the double wall type and uniformly cooled as they are contacted by very hot gas. Another drawback is the considerable overall axial or longitudinal size of the apparatus, arising from the fact that the diffuser generally extends only in this direction. Also, it is necessary to keep the zone underneath the power turbine free for locating the support on the base of its stator casing, so that the exhaust casing cannot contain the power turbine but can only be aligned therewith. In this respect, in order to limit the overall size, this type of design generally uses shorter diffusers which, however, release the gas at a still higher speed, generally exceeding 100-130 m/sec., leading to a further efficiency loss due to the unrecovered kinetic energy of the gas, and high exhaust noise.

Finally, further constructional complications, including those relating to overall height arise from the fact that, as the exhaust casing is hot (i.e., at a temperature of about 400°-500° C.), it is unable to directly support the exhaust silencer or overhead travelling cranes which are necessary for dismantling the power turbine and compressor, and expansion compensators, together with additional structures, must therefore be disposed between them together with additional structures.

In order to obtain higher efficiencies, an attempt has been made to eliminate the main cause, namely the support ribs for the bearing of the rotating shaft, by supporting the shaft in a cantilever manner by means of a support structure which is independent from that of the stator casing, the load on this structure being supported outside the exhaust casing at the opposite end to the power turbine. This method however has the drawback that if the independent supports for the stator casing and power turbine rotor are at different temperatures during operation and thus undergo different degrees of expansion, as generally happens, the result is very dangerous misalignment between the rotor and stator. In order to take account of this, it is necessary to provide fairly large gaps between said parts, with a resultant considerable negative influence on the efficiency, which thus increases only slightly. Furthermore, this latter method still has the previously stated drawbacks of overall size and constructional complications.

The object of the present invention is to obviate the described drawbacks, and thus provide a power gas turbine having high efficiency, low overall dimensions and constructional simplicity.

According to the present invention, there is provided a power gas turbine comprising a base, an air intake casing on the base which supports the upstream end of a gas turbine. The stator casing of the turbine is connected to a downstream support cone which connects the turbine to an exhaust casing having a generally upward outlet into which the gas is discharged via an annular conical diffuser. The rotor of the turbine is supported in a cantilever manner by a support which bears on the base outside the exhaust casing at that end thereof away from the power turbine. The exhaust casing, which is strengthened on its two faces by two strengthening rings, is supported on its two faces by means of four pins parallel to the turbine axis. The pins are fixed, in positions lying on the horizontal plane passing through the turbine axis, to the two strengthening rings on the two faces of the exhaust casing, and the pins are inserted by way of four insulating bushes into four fixed bushes mounted on four flexible legs two of which legs are fixed to the base upstream of one face of the exhaust casing and the other two of which legs are fixed to the base downstream of the other face of the exhaust casing. The exhaust casing also has in its interior an insulating pocket which conveys the hot exhaust gas from the diffuser. The pocket is constructed from plates insulated towards the exterior, and includes horizontal lugs on the sides thereof which rest by way of insulating material on corresponding support surfaces provided on the exhaust casing in positions lying on the horizontal plane containing the turbine axis. The pocket also has an upright key on each face thereof, which is inserted into a corresponding upright guide in the exhaust casing in a position lying in the vertical plane passing through the turbine axis. The insulating pocket is pressed into the exhaust casing by springs acting between the insulating pocket and the exhaust casing. Moreover, means are provided for enabling the exhaust casing to directly support the power turbine stator casing in a manner such that the stator casing can expand, and for ensuring the lateral centering of the aforesaid components on the base.

With the present invention attained by eliminating the power turbine rotor-stator connection ribs are eliminated and the rotor and stator are supported by independent supports, such that the independent supports always are at the same temperature so that they always undergo equal thermal expansion, thereby ensuring alignment between the rotor axis and stator axis, using narrow gaps and thus resultant high efficiency. As the rotor support is kept at a relatively low temperature of about 80° C. by the considerable flow of oil discharged into the structure after lubricating the rotating shaft bearings, the problem therefore becomes one of lowering the temperature of the stator support to this value of 80° C. This basically means making provisions that the temperature of the hot gas leaving the exhaust casing at the high temperature of 400°-500° C. does not influence the surrounding external environment, thus keeping the exhaust casing externally cold.

In this respect, the advantages of a strong exhaust casing operating at a relatively low temperature of 100°-150° C., i.e. a substantially cold exhaust casing, are obvious. Firstly, it enables very high loads, and in particular the exhaust silencer and the guide girders for the overhead travelling cranes necessary for dismantling and maintaining the turbine and compressor, to be directly supported without the interposing of expansion compensators and auxiliary structures, thus leading to considerable simplification not only of a constructional nature but also in terms of overall height. In addition, the exhaust casing can also internally house the power turbine and directly support the downstream cone of the turbine stator casing, with consequent considerable reduction in the overall axial length of the apparatus. It now also becomes easy to obtain the small temperature rise of 20°-70° C. required for raising the exhaust casing supports, which are also the supports for the turbine stator casing, to the temperature of 80° C. required to ensure coaxiality between the power turbine rotor and stator, by simply supporting the exhaust casing on four flexible legs pivoted to the casing on its central horizontal plane by way of insulating bushes. Finally, by virtue of the fact that the cold exhaust casing is cold, the required ventilation air flow rate is considerably reduced, with a consequent increase in the efficiency of the unit due to the lower power required by the fans. In addition the danger of fire due to oil leakages onto the exhaust casing is reduced.

Thus, according to one characteristic of the present invention, inside a strong carbon steel exhaust casing strengthened on its two faces by two thick forged rings, there is housed the insulating pocket for conveying the hot exhaust gas from the diffuser. The pocket can be constructed in a single piece from thin stainless steel plates insulated towards the exterior, comprising four horizontal lugs, two on each side of the pocket, which rest by way of insulating material on corresponding support surfaces provided on the exhaust casing in positions lying on the horizontal plane containing the turbine axis, and two vertical keys, one on each face of the pocket, which are inserted into corresponding vertical guides provided on the exhaust casing in positions lying on the vertical plane passing through the turbine axis. The pocket is kept pressed within the exhaust casing by a set of stainless steel springs acting between the outlet flange of the insulating pocket and brackets of the exhaust casing.

In this manner, the insulating pocket is kept generally centered within the exhaust casing while being able to expand freely as required when in operation. Again, as the pocket is constructed in a single piece from thin stainless steel plates of about 2 mm thickness profiled substantially as cylindrical or conical surfaces to enable a simple and particularly robust structure to be attained without the need for stiffeners or brackets of any kind, the pocket can be effectively insulated on its exterior as it comprises a smooth outer surface which is extremely easy to insulate. The insulation is made even more simple by the fact that the pocket can be easily inserted into and withdrawn from the exhaust casing by simply acting on the set of springs. In other words, once the insulation has been mounted, the pocket is lowered from the upper mouth of the exhaust casing and fixed into the casing by means of the springs. In addition, the particular system for suspending the pocket inside the exhaust casing practically eliminates all thermal bridges in that those mechanical contacts which normally lead to the greatest heat leakage and low efficiency of normal insulation now become only minimal, being represented only by the set of springs which however being of stainless steel are poor heat conductors. There is thus an effective barrier to the passage of heat from the pocket to the exhaust casing, which can thus be kept cold at a temperature of about 100°-150° C. The result of this is that the exhaust casing can now be used as a load-bearing structure for directly supporting not only the exhaust silencer and the channel girders acting as guides for the overhead travelling cranes required for dismantling and assembling the turbine and its driven compressor, but also the power turbine stator casing.

As the exhaust casing supports now also act as supports for the power turbine stator casing and, as already stated, must therefore be raised to a temperature of 80° C., according to a further characteristic of the present invention, the exhaust casing is supported on both faces by four pins disposed parallel to the turbine axis which are bolted, in positions lying on the horizontal plane passing through the turbine axis, on to the two thick forged strengthening rings on the two faces of the exhaust casing, and are inserted by way of four insulating bushes into four fixed bushes mounted at the upper ends of four strong flexible steel plate legs, the lower ends of which are flanged to the base, two legs being upstream of that face of the exhaust casing at the air intake end and the other two legs being downstream of the other face.

In this respect, the use of pins and bushes for supporting the exhaust casing along its horizontal plane not only allows easy insulation by simply interposing insulating bushes between the pins and fixed bushes, this insulation being sufficient to further reduce the temperature of the legs to the required value, but also leaves the exhaust casing free to expand both radially and axially. During axial expansion of the exhaust casing, the fixed point is that face of the casing which faces the gas generator. In other words, according to the invention the two front exhaust casing support legs, i.e. the two legs flanged on to the base at the air intake end, constitute the fixed point in the axial direction for the entire unit in that the respective front pins, by the effect of abutments, are unable to slide axially in the relative bushes not only to rotate. Again according to the present invention, the exhaust casing is provided at the bottom of its two faces with two vertical cavities contained in the vertical plane passing through the turbine axis, which cavities cooperate with suitable teeth to prevent lateral displacement of the central vertical plane of the exhaust casing, so ensuring lateral centering. According to a preferred embodiment of the invention, the exhaust casing is also supported by a further four spring supports acting at the bottom of its two sides. The purpose of these spring supports is to partially release the flexible legs from the loads transmitted by the exhaust silencer and overhead travelling cranes.

Finally, according to a further characteristic of the present invention, the downstream support cone flanged to the power turbine stator casing is insulated externally, is inserted completely into the exhaust casing against which it is sealed by means of a suitable flexible seal element, and comprises on its free periphery a forged ring carrying on its outer diameter, in positions corresponding with its horizontal central plane, two opposing horizontal teeth which are inserted and supported in two corresponding cavities provided at the base of said pins relative to said two upstream support legs for the exhaust casing. The ring also is provided at its bottom, on its vertical central axis, with a block comprising two opposing vertical teeth inserted respectively into a vertical cavity in the base and a vertical cavity provided in a block fixed on to the bottom of said thick forged strengthening ring on the upstream face of the exhaust casing, the two vertical cavities being aligned with respect to a vertical plane containing the turbine axis. In this manner, the thrusts and moments produced by the gas generator and power turbine are unloaded, by way of the horizontal teeth, onto the pins and consequently onto the two upstream support legs for the exhaust casing, which thus act as a support for the power turbine stator casing, whereas the other vertical teeth in cooperation with the vertical cavities ensure perfect lateral centering on the base both of the exhaust casing and of the cone and thus of the power turbine stator casing, while at the same time allowing thermal expansion.

The invention is described in detail hereinafter with reference to the accompanying drawings which illustrate a preferred embodiment of the invention, is being understood that technical, technological or constructional modifications can be made thereto within the scope of the present invention.

In the drawings

Figure 1:
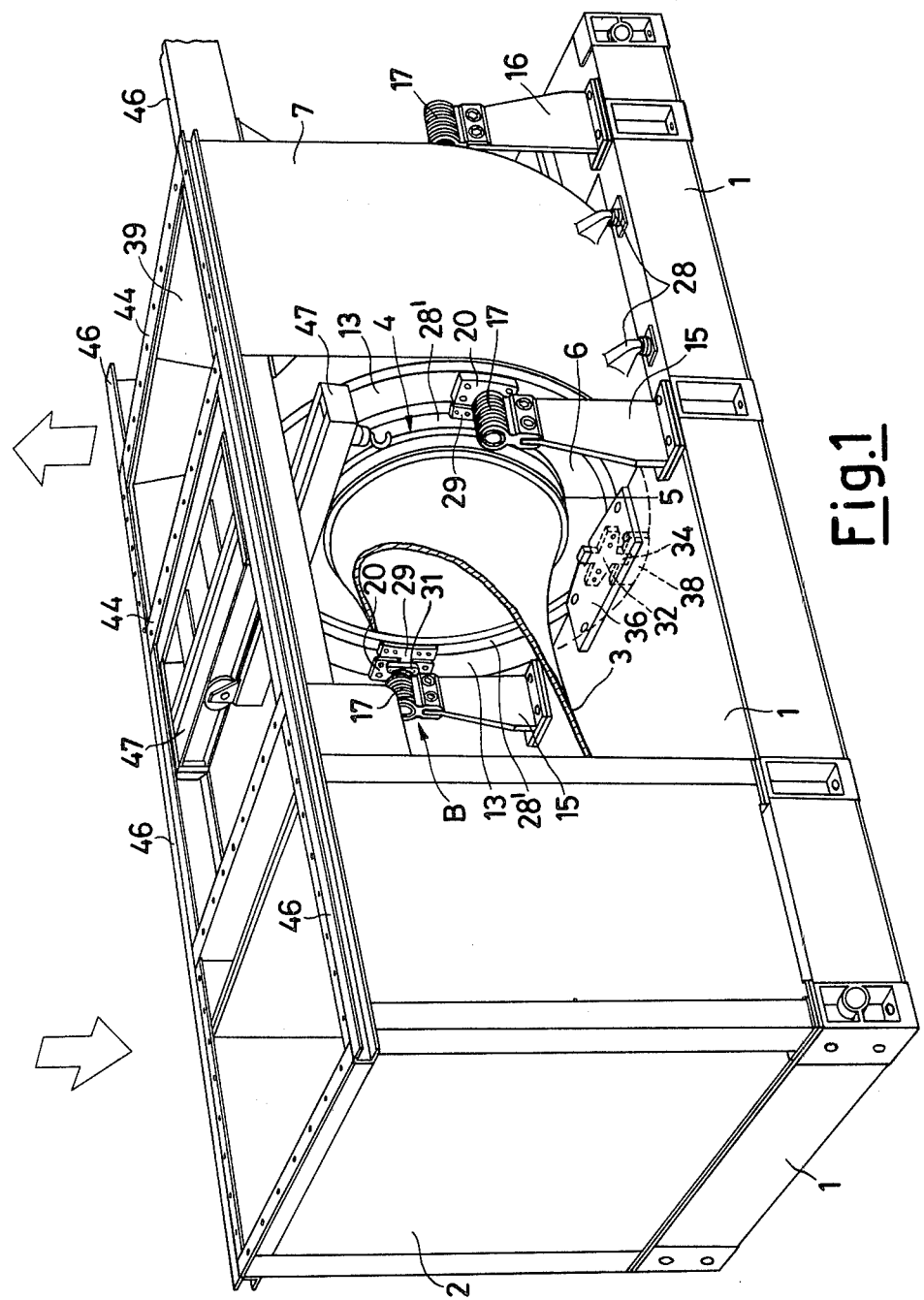
FIG. 1 is a partly sectional perspective view of a power gas turbine incorporating the improvements according to the invention.

With reference to the drawings there is shown a base 1 on which is fixed the air intake casing 2 which supports the upstream end of a gas generator 3, the downstream end of which is rigid with a power turbine 4. The stator casing 5 of the turbine 4 is connected in a flanged manner to a downstream support cone 6 which is insulated externally 6A and is completely inserted into an exhaust casing (7) having a vertical outlet 7 into which the exhaust gas from the turbine 4 is conveyed by a conical annular diffuser 8 (see specifically FIG. 2).

Figure 2:
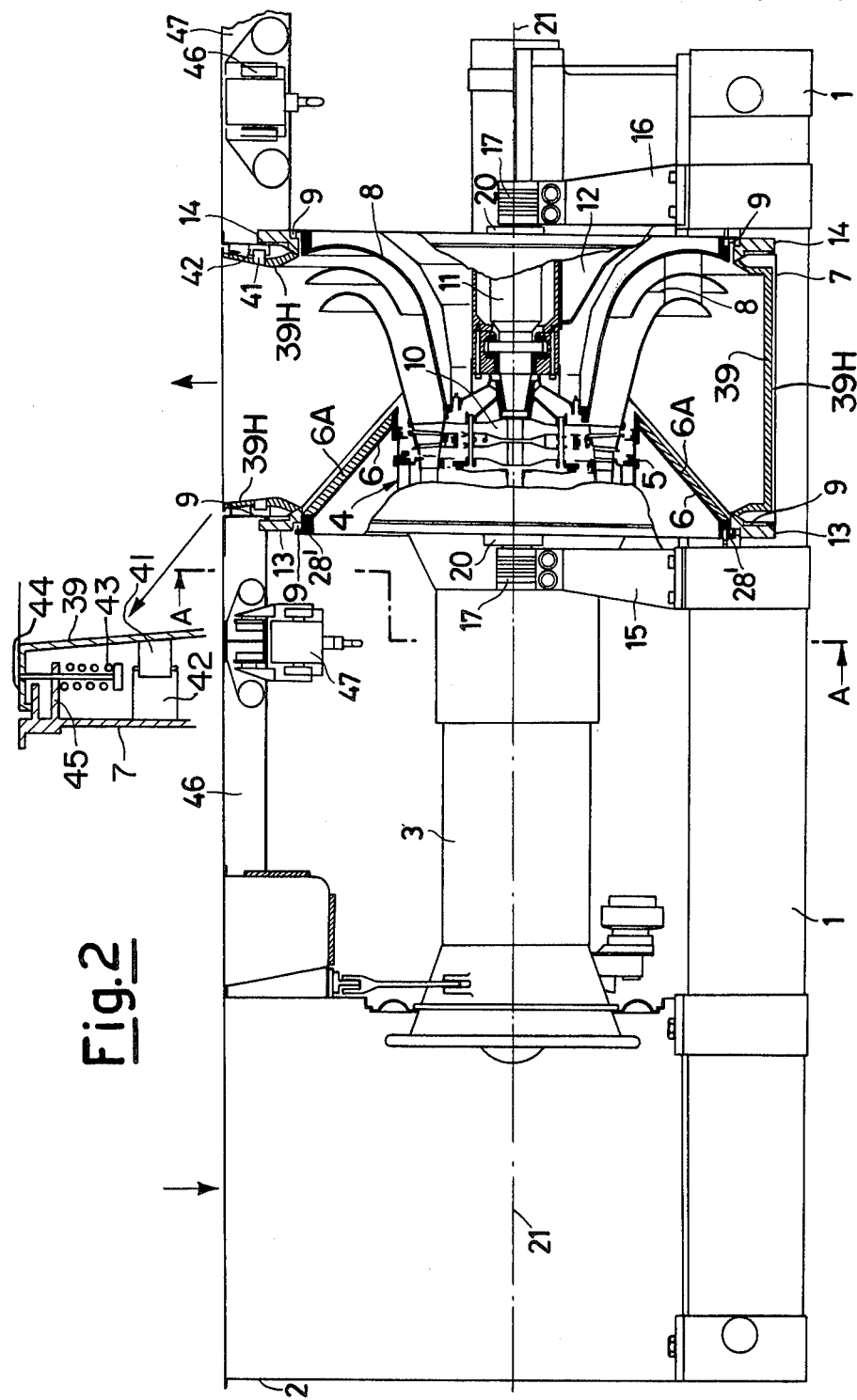
FIG. 2 is a longitudinal section through the power gas turbine of FIG. 1.

There is a gap between the cone 6 and casing 7, which is closed by a flexible spiral seal element 9 that is the subject matter of another of our patent applications (see FIG. 2).

The rotor 10 and consequently the rotating shaft 11 of the power turbine 4 is cantilever supported by an independent structure 12 supported on the base 1 outside the exhaust casing 7 at the end distant from the power turbine 4 (see FIG. 2).

The exhaust casing, constructed of carbon steel and strengthened on its upstream and downstream faces by two thick forged rings 13 and 14 respectively, is supported on both faces by four strong flexible steel plate legs, two upstream ones 15 and two downstream ones 16, which are connected at their bottoms to the base 1 in a flanged manner. Each leg 15, 16 supports at its upper end a fixed bush 17 into which a pin 19 is inserted with an insulating bush 18 therebetween. The four pins 19 are welded to flanges 20 bolted onto the thick strengthening rings 13 and 14 of the exhaust casing 7 in positions lying on the horizontal plane passing through the turbine axis 21 (see FIG. 2) in such a manner that the pins 19 are disposed parallel to said turbine axis 21.

The two pins 19 relative to the two upstream legs 15 (see specifically FIG. 6) are prevented from sliding axially along the respective fixed bushes 17 by two internal circumferential shoulder projections 22 and 23 on the fixed bush 17, between which the insulating bush 18 is retained in a rotatable manner. The bush 18 is rigid with the respective pin 19 in terms of translational movement by an abutting ring nut 24 screwed on to the pin 19.

Figure 3:
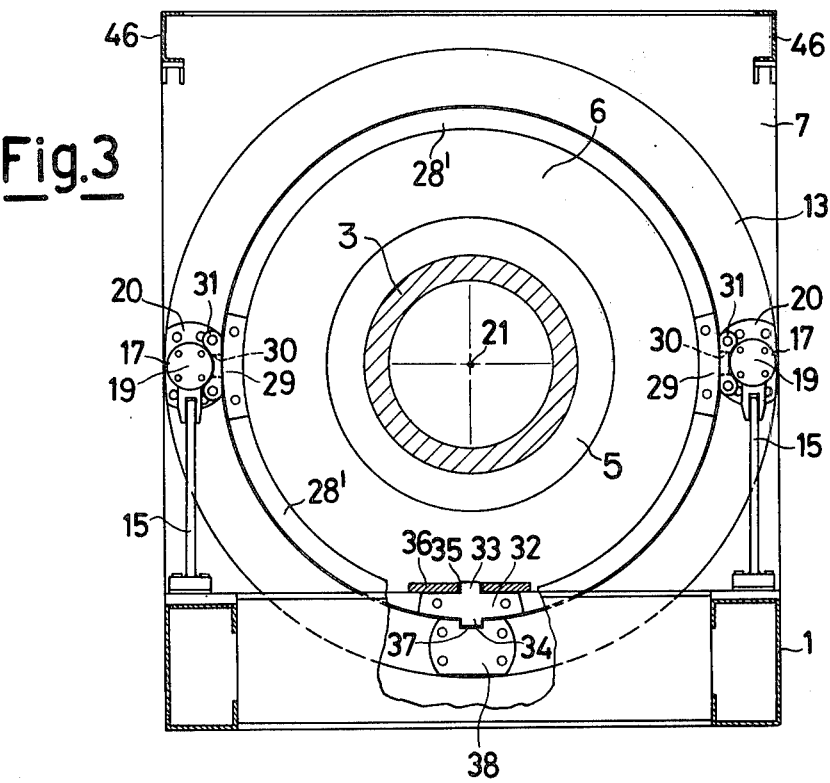
FIG. 3 is a diagrammatic section through the power gas turbine taken on the line AA of FIG. 2.
Figure 6:
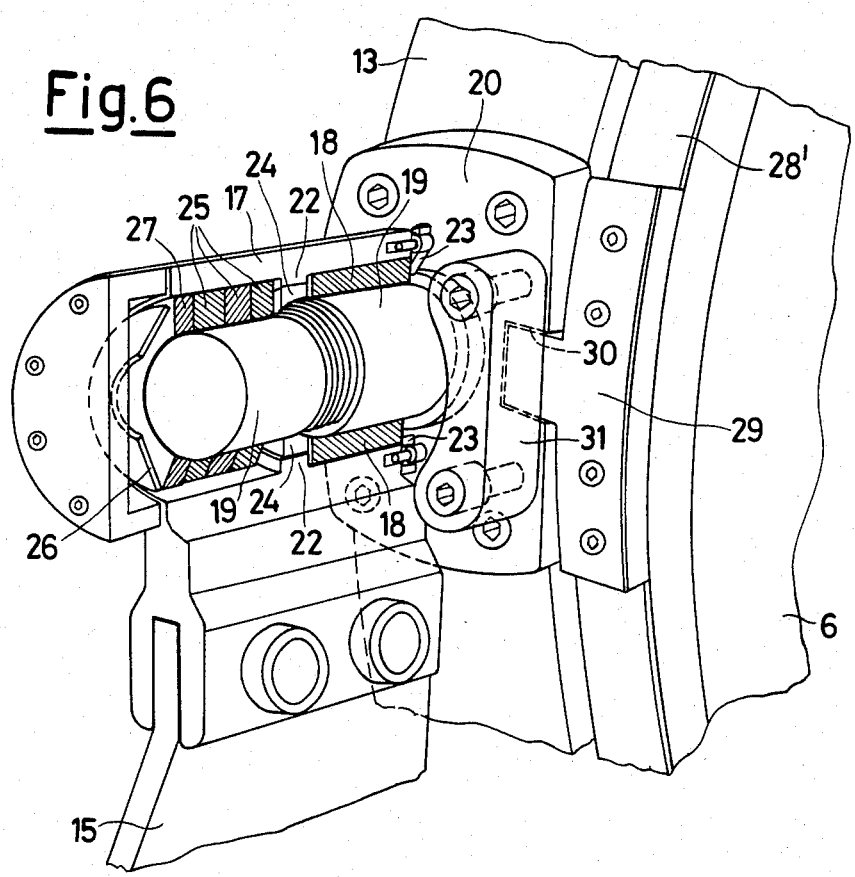
FIG. 6 is a perspective sectional view, to an enlarged scale, of the detail B of FIG. 1.

FIG. 6 also shows three asbestos tetrafluorate rings 25 which serve to damp the vibrations which are kept in place by the action of a spring 26 against a pressure disc 27 which presses them against the shoulder projection 22. The exhaust casing 7 is also supported by four spring supports 28 (see FIG. 1) acting against the bottom of its two sides (only two can be seen in the figure, the other two being on the opposite side) the casing in its turn supports the stator casing 5 of the power turbine 4. For this purpose, the downstream support cone 6, connected in a flanged to the stator casing 5, is provided on its free periphery with a forged ring 28' which, in positions lying on its horizontal central plane, are bolted two horizontal opposing projecting teeth 29 which are inserted and supported in two corresponding cavities 30 provided in the flanges 20 to which the pins 19 of the upstream support legs 15 are welded. Stop blocks 31 are provided for preventing the teeth 29 from discharging from their respective cavities. To the upstream end of the forged ring 28' of the support cone 6, on the vertical central axis of the ring, there is also bolted a block 32 provided with two vertical opposing teeth 33 and 34 (see FIGS. 1 and 3) which are inserted respectively into a vertical cavity 35 provided in a plate 36 fixed to the base 1 and into a vertical cavity 37 provided in a block 38 fixed on to the bottom of said thick forged strengthening ring 13 on the upstream face of the exhaust casing 7, the two said vertical cavities 35 and 37 being aligned in a vertical plane containing the turbine axis 21. In this manner, the exhaust casing 7 and cone 6, and consequently the stator casing 5 of the power turbine 4, are simultaneously centred on the base 1.

Figure 5:
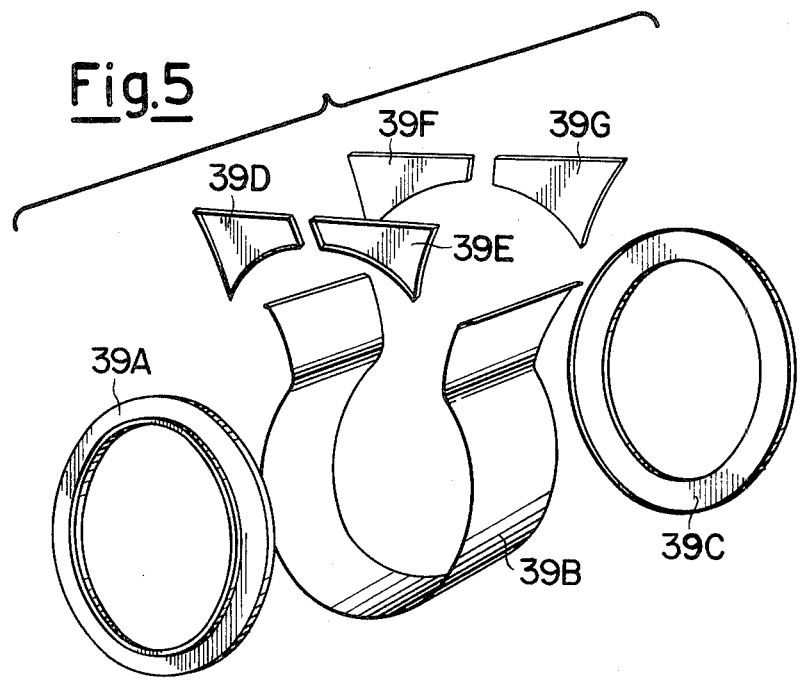
FIG. 5 is an exploded view of the thin stainless steel plates which form the insulating pocket of FIG. 4.
Figure 4:
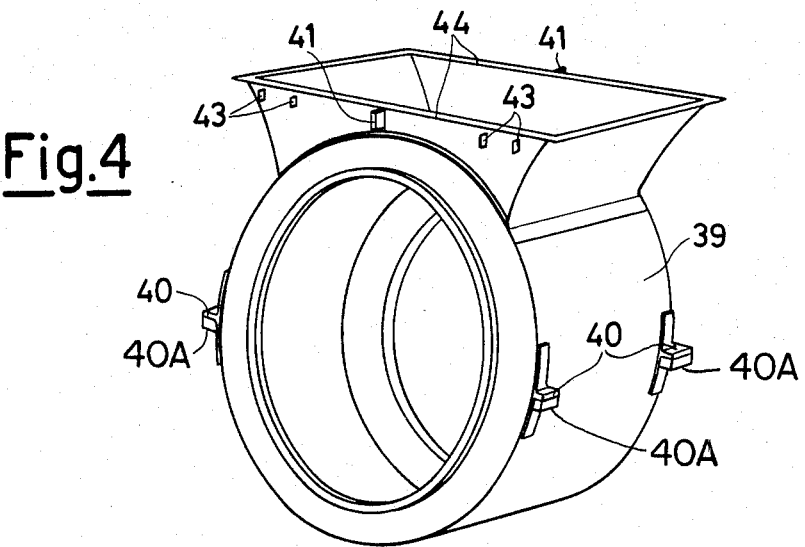
FIG. 4 is a perspective view of the insulating pocket according to the invention used in the power gas turbine of the invention.

Finally, in the exhaust casing 7 there is housed an insulating pocket 39 for conveying the hot exhaust gas from the diffuser 8, while keeping said exhaust casing cold. The pocket 39 is constructed of thin stainless steel plates, from 39A to 39G (see FIG. 5), welded together to form a single piece (see FIG. 4) which can be easily insulated on the outside by insulation 39H. It is also provided with four horizontal lugs 40, two on each side of the pocket 39, which rest by way of insulating material 39H on corresponding support surfaces provided on the exhaust casing 7 in positions lying on the horizontal plane containing the turbine axis 21. Two vertical keys 41 (see specifically FIG. 2), one on each face of the pocket, are inserted into corresponding vertical guides 42 provided on the exhaust casing 7 in positions lying on the vertical plane passing through the machine axis 21. In addition the pocket 39 is kept pressed within the exhaust casing 7 by a set of stainless steel springs 43 acting between the upstream outlet flanges 44 of the insulating pocket 39 and the brackets 45 of the exhaust casing 7 (see FIG. 2).

The air intake casing 2 and exhaust casing 7 constitute the two load-bearing piers which directly support the intake and exhaust silencers (not shown in the figures) and the channel girders 46 which act as guides for the overhead travelling cranes 47.

I claim:

1. A power gas turbine including a gas generator and power turbine having a stator casing and a rotor therewithin, comprising:

a base, an air intake casing on said base which supports the upstream end of the gas generator wherein the generator has its downstream end rigid with the power turbine, an exhaust casing having a generally upward outlet, an annular diffuser which receives the gas from the power turbine and discharges it through said outlet, and a support cone connected to said stator casing and said exhaust casing for supporting the stator casing within said exhaust casing, a support connected to the rotor which supports the rotor in a cantileter manner and which bears on said outside said exhaust casing at the end thereof away from the power turbine, said exhaust casing is strengthened on its opposing faces by strengthening rings thereon and is supported on said base by means including four parallel pins, two of which are fixed to each strengthening ring on the two faces of said exhaust casings in positions lying on the horizontal plane passing through the turbine axis, bushes for each of said pins fixed to said strengthening rings and into which said pins are inserted, insulating bushes within said fixed bushes and about said pins, four flexible legs, two of which are fixed to said base and connected to said bushes upstream of one face of said casing and the other two of which legs are fixed to said base and connected to said bushes downstream of the other face of said exhaust casing, an insulating pocket in said exhaust casing which conveys the hot exhaust gas from said diffuser through said outlet and is constructed from plates externally insulated, said pocket having horizontal lugs on the sides thereof which rest by way of insulating material on said exhaust casing in positions lying in the horizontal plane containing the turbine axis, and having an upright key on each face thereof, which key is inserted into a corresponding upright guide on said exhaust casing in a position lying in the vertical plane passing through the turbine axis, the insulating pocket being pressed into the exhaust casing by springs acting between said insulating pocket and exhaust casing, means connected to the upstream end of said support cone for enabling said exhaust casing to directly support the power turbine stator casing in a manner such that the stator casing can expand, and means connected to said support case for ensuring the lateral centering of the aforesaid components on said base.

2. A power gas turbine as claimed in claim 1, wherein said support cone is insulated externally, is completely inserted into said exhaust casing and has a ring on its outer periphery at the upstream end of said exhaust casing, and wherein said means for enabling said exhaust casing to support the stator casing includes opposing cavities in said strengthening rings at the base of said two upstream pins, and opposing teeth extending from said peripheral ring on said supporting cone which are inserted into said cavities.

3. A power gas turbine as claimed in claim 2, wherein said means for ensuring lateral centering of said exhaust casing and power turbine on said base, includes a vertical cavity in said base and an opposing vertical cavity in a block fixed to the bottom of said strengthening ring on the upstream face of said exhaust casing, said vertical cavities being aligned on a vertical plane containing the turbine axis, and a block mounted on and at the bottom of said ring on the periphery of said support cone having two opposing teeth which extend from said block and which are inserted into said two opposing cavities.

4. A power gas turbine as claimed in claim 1, wherein said two pins fixed to said strengthening ring on the upstream face of said exhaust casing are prevented from sliding axially along their respective fixed bushes by two internal circumferential shoulders on each fixed bush, the insulating bush being rotatably retained between said shoulders and being rigid with its respective pin relative to translational movement by an abutting ring nut screwed onto said pin.

* * * * *